United States Patent [19]

Lo et al.

[11] Patent Number: 5,572,633
[45] Date of Patent: Nov. 5, 1996

[54] KEY-SUBJECT ALIGNMENT METHOD AND PRINTER FOR 3D PRINTING UTILIZING A VIDEO MONITOR FOR EXPOSURE

[75] Inventors: Allen K. W. Lo, Dunwoody; Kenneth Q. Lao, Atlanta, both of Ga.

[73] Assignee: Image Technology International, Inc., Norcross, Ga.

[21] Appl. No.: 418,016

[22] Filed: Apr. 6, 1995

Related U.S. Application Data

[63] Continuation-in-part of Ser. No. 333,201, Nov. 2, 1994, which is a continuation-in-part of Ser. No. 1,025, Jan. 9, 1993, abandoned.

[51] Int. Cl.⁶ .................................................. G06K 15/00
[52] U.S. Cl. ............................................ 395/117; 395/119
[58] Field of Search ................................ 395/101, 102, 395/112, 117, 119, 125, 127; 353/8; 355/22; 352/57, 58, 60; 346/134, 139 R, 139 C; 250/558; 356/2

[56] References Cited

U.S. PATENT DOCUMENTS

| | | | |
|---|---|---|---|
| 2,472,259 | 9/1946 | McPherson | 88/16.6 |
| 2,912,488 | 11/1959 | Smith | 178/5.4 |
| 3,109,057 | 10/1963 | Slavecki | 178/6.5 |
| 3,688,045 | 8/1972 | Ohkoshi | 178/6.5 |
| 3,895,867 | 7/1975 | Lo | 355/77 |
| 3,953,869 | 4/1976 | Lo | 354/115 |
| 4,101,210 | 7/1978 | Lo | 353/7 |
| 4,120,562 | 10/1978 | Lo | 350/130 |
| 4,132,468 | 1/1979 | Lo | 353/7 |
| 4,468,115 | 8/1984 | Lao | 355/22 |
| 4,506,296 | 3/1985 | Murraud | 358/88 |
| 4,807,024 | 2/1989 | McLaurin | 358/88 |
| 4,893,898 | 1/1990 | Beard | 350/132 |
| 4,903,069 | 2/1990 | Lam | 355/22 |
| 5,028,950 | 7/1991 | Fritsch | 355/22 |
| 5,036,356 | 7/1991 | Lo | 355/77 |
| 5,127,037 | 6/1992 | Bynum | 378/4 |
| 5,255,054 | 10/1993 | Tsai | 355/202 |

*Primary Examiner*—Arthur G. Evans
*Attorney, Agent, or Firm*—Deveau, Colton & Marquis

[57] ABSTRACT

A 3D printer for producing 3D photographs on lenticular print material in which a video monitor is used to display stored digital 2D images of different views of a scene for exposure. Prior to printing, one of the stored 2D image is displayed on a viewing monitor and the key subject image of the displayed 2D image is selected. Based on the location of the selected key subject image, the computer searches for the key subject location of each of the other stored 2D images and electronically shifts the 2D images so that the key subject location of all different views is the same. During printing, the electronically shifted 2D images are sequentially displayed on the video monitor and projected through a projection lens onto the lenticular screen at different projection angles.

18 Claims, 8 Drawing Sheets

KEY-SUBJECT ALIGNMENT METHOD AND PRINTER FOR 3D PRINTING UTILIZING A VIDEO MONITOR FOR EXPOSURE

This is a continuation-in-part application of pending application, Ser. No. 08/333,201, filed Nov. 2, 1994, which, in turn, is a continuation-in-part application of another application, Ser. No. 08/001,025, filed Jan. 9, 1993, abandoned.

BACKGROUND OF THE INVENTION

1. Field of Invention

The present invention relates, in general, to a photographic printing method and apparatus for producing three-dimensional (3D) pictures on lenticular print material. More specifically, it relates to a 3D printer which uses a video monitor for exposure.

2. Prior Art

In lenticular 3D photography, the basic process involves taking a plurality of two-dimensional (2D) images of a scene from a number of horizontally-spaced vantage points, and exposing the 2D images on lenticular print material, through one or more projection lenses, at different projection angles. It is well-known that lenticular print material is made of a lenticular screen coated with or attached to photosensitive emulsion, and a lenticular screen is a transparent sheet embossed with a contiguous array of semi-cylindrical lenses, or lenticules. When a series of 2D images are exposed through the lenticular screen, these 2D images are optically compressed to become line-form images. It should be kept in mind that a 3D picture is composed of 2D images of slightly different views of a scene, therefore, these 2D images must be accurately aligned with each other in reference to a common point in the scene. This reference point is known as the key subject in 3D photography and the alignment process is usually referred to as the key subject alignment.

Various techniques for exposing a series of 2D images onto lenticular print material have been disclosed in the past. U.S. Pat. No. 4,120,562 (Lo et al.) discloses a scanning method which uses an apparatus for changing the projection angles to properly fill the lenticules. U.S. Pat. No. 5,028,950 (Fritsch) discloses a dual-stage printer comprising an editing station and a printing station. In this disclosed dual-stage printer, the key subject locations in the 2D image frames are determined in the editing station while the exposing is carried out in the printing station. U.S. Pat. No. 5,036,356 (Lo) discloses a multi-lens camera preloaded with a roll of film on which a set of target images are exposed to assist key subject alignment.

Presently, in order to produce a 3D picture, it is necessary to take a series of 2D images and record these images on film. During printing, the 2D views recorded on film, or 2D negatives, are separately brought to an exposing position under the lamphouse in a 3D printer so that the images on the 2D negatives are separately projected through a projection lens onto a lenticular print material. It is understood that the print material and the projection lens must be moved to different positions in relation to the exposing position so that each 2D image is projected at a different projection angle. Furthermore, prior to exposure, the position of each 2D negative must be separately adjusted by mechanical means so that the key subject image in each 2D view can be precisely aligned with each other on the print material. Thus, in order to achieve a good registration of 2D views on a 3D picture, a conventional 3D printer must be equipped with a complex optical and computational device for locating the exact location of key subject in each 2D view; and a precise mechanical assembly for separately adjusting the position of each 2D negative at the exposing position under the lamphouse.

It is desirable to provide a 3D printer in which the key subject alignment process is greatly simplified, and the mechanical means for adjusting the 2D negatives is eliminated.

SUMMARY OF THE INVENTION

The 3D printing method, according to the present invention, uses a video or computer monitor to sequentially display a series of 2D images for exposure. This printing method is drastically different from the conventional 3D printing method wherein 2D images recorded on film (i.e. 2D negatives) illuminated by a lamphouse are projected onto the print material for exposure. In the 3D printing method according to the present invention, the key subject alignment is carried out electronically in the computer. Consequently, the present invention eliminates the need for a special optical assembly to separately read the key subject image in each 2D view and a mechanical assembly to separately adjust the position of each 2D negative for key subject alignment.

Briefly described, the 3D printing method, according the present invention, uses the monitor screen of a video monitor to display 2D images of different views of a scene, one view at a time, and uses a projection lens to sequentially expose the displayed 2D image of each view onto lenticular print material at a different projection angle. The 2D images of different views of a scene are, preferably, stored as digital files in a computer workstation prior to or at the time of printing. Prior to being used to compose a 3D picture for the first time, a set of 2D images is electronically processed so that the key subject in each 2D image is aligned with each other. This process is hereafter referred to as the electronic alignment process and will be described in conjunction with the detailed description of FIG. 1. Furthermore, before the 2D images are displayed on the monitor screen, they may be converted into mirror images and their color corrected to suit the optical characteristics of the print material. In order that the 2D images properly fill the photosensitive emulsion underlying the lenticules of the print material with compressed line-form images, the 2D images of different views must be projected onto the print material at different projection angles. At all times, the print material is maintained substantially parallel to the monitor screen, and the projection lens is maintained to properly focus on the monitor screen and the print material. The video monitor may be used in a vertical or a horizontal position. Moreover, in order to minimize the possible Moire effect produced on the 3D picture, it may be necessary that the video monitor be tilted by a certain angle from a vertical or horizontal position while maintaining the screen substantially parallel to the print material. The digital 2D images stored in the computer can be read from a variety of input devices and the 2D images can be acquired by a single-lens camera or a multiple lens cameras, acquired by one or more electronic cameras, or generated by a computer. These 2D images can also be combined from images of different scenes.

For each set of 2D images, the electronic alignment process is carried out only once and it is not required in subsequent printing. This is in contrast to the conventional 3D printing method wherein 2D negatives must be adjusted every time a 3D picture is made.

Furthermore, with the 3D printing method according to the present invention, the color, intensity and the objects in the 2D images can be electronically processed and manipulated. For example, objects in the scene can be selectively deleted, added, rescaled or moved to different locations; the color and brightness of objects in the scene can be selectively altered; and images of different scenes can be combined.

It is an object of the present invention to provide a printing method and apparatus for printing 3D pictures from a series of digital 2D images, using the monitor screen of a video monitor to sequentially display 2D images of different views of a scene for exposure.

It is another object of the present invention to achieve a good key subject alignment by electronically shifting the images of 2D views in computer memory thereby eliminating the need for suing mechanical means to adjust the position of 2D views recorded on film.

It is a further object of the present invention to provide a photographic printing method and apparatus wherein 2D images for composing the 3D pictures can be electronically processed and manipulated.

It is yet another object of the present invention to provide a 3D printing method and apparatus wherein 2D images for composing 3D pictures can be received from a variety of input media devices such as electronic cameras, CD ROMS, photo-CDs, image scanners and magnetic storing devices.

Another object of the present invention is to provide a printing method and apparatus wherein a 3D picture may be produced by a number of exposure methods such as displaying color images, black-and-white images, RGB or CMY color component images on a monitor screen for exposure.

These and other objects, features, and advantages of the present invention will become apparent upon reading the following specification in conjunction with the accompany drawing figures.

DETAILED DESCRIPTION OF THE INVENTION

Figure 1:
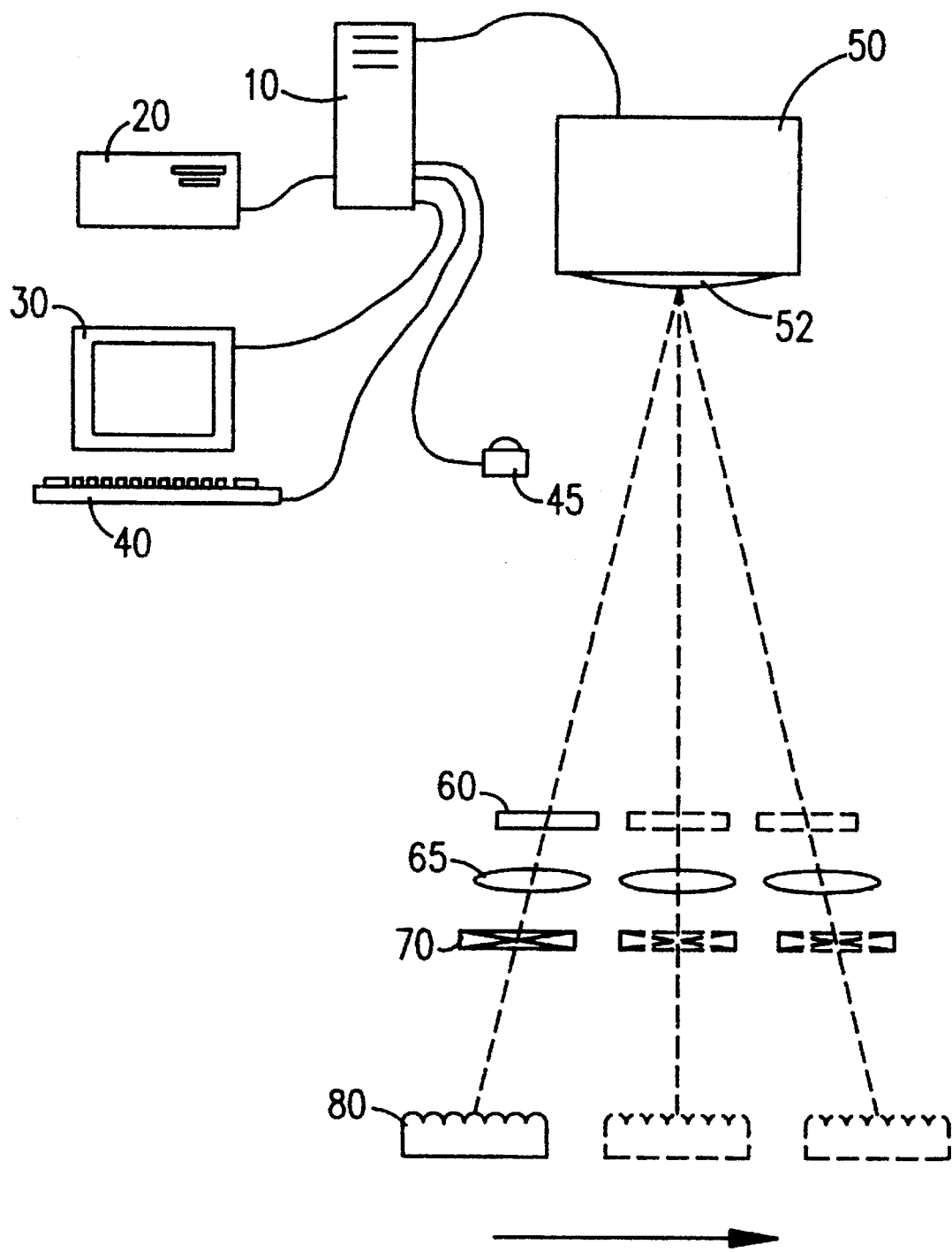
FIG. 1 is a schematic representation of the 3D printer, according to present invention.

FIG. 1 is a schematic representation of the preferred embodiment of the photographic printer for making 3D pictures, according to the present invention. In FIG. 1, numeral 10 denotes a computer or a computer workstation, and numeral 20 denotes an image input device which is used to receive 2D images of different views of a scene from an electronic medium and transfers these 2D images into the computer workstation 10, to be stored as digital files. Numeral 30 denotes a viewing monitor for display texts or images for viewing. Numeral 40 denotes a computer keyboard for an operator to communicate with the computer 10. Numeral 45 denote a tracking device such as a trackball, a mouse or a light pen to be used by an operator to select the key subject on the 2D image displayed on the viewing monitor. Numeral 50 denotes an exposing monitor, or a video or computer monitor with screen 52 for display 2D images for exposure. Numerals 60, 65 and 70 denote, respectively, color filters, a projection lens and a shutter; numeral 80 denotes a section of lenticular print material.

The 2D images read into the computer, in general, must be processed so that the key subject in all different views is located at the same pixel location. These 2D images are processed by an electronic alignment process as follows:

1. One of the 2D views, say View 1, is displayed, preferably on the video monitor 30 to allow an operator to select the key subject with a tracking device. Let the pixel location of the key subject on the displayed image be (x,y).

2. A portion of View 1, bounded by pixels (x–a, y–b), (x+a, y–b), (x+a, y+b) and (x–a, y+b), is used as a template. Preferably a=b, and a, b are ranging from 5 to 100 pixels or more depending on the image size and pixel resolution.

3. A portion of the image of another view, say View 2, bounded by pixel (x–c, y–d), (x+c, y–d), (x+c, y+d) and (x–c, y+d), is used as a search area for view 2. Here c>a, d>b and preferably c=d, and (c–a), (d–b) are ranging from 5 to 100 pixels or more to ensure that the key subject image in View 2 is located within the search area.

4. Let the pixel intensity of pixel (p,q) in View 1 be B1 (p,q) and the pixel intensity of pixel (r,s) in View 2 be B2 (r,s). In order to locate the key subject image in View 2, the template is electronically moved around the search area to find a match in the image. More specifically, the computer computes a series of correlation coefficients, S(m,n), where $$S(m,n) = \sum_i \sum_j \{B1(i,j) - B2(i+m, j+n)\}^2$$

where (x–a)≦i≦(x+a), (y–b)≦j≦(y+b);

(a–c)≦m≦(c–a), and (b–d)≦n≦(d–b).

From the computed results of S(m,n), the computer searches for the minimum value of S. Assuming that the minimum valve occurs when m=u and n=v, or S(u,v) is the minimum value in the series of correlation coefficients, the pixel location of the key subject in View 2 is located at (x+u, y+v).

5. The entire image of View 2 is shifted by a distance (u,v) such that a pixel (r,s) of View 2 will be relocated at (r–u, v–s) after shifting. Accordingly, the key subject image of View 2 is moved from (x+u, y+v) to (x,y). After shifting, the key subject location in View 2 is the same as the key subject location of View 1.

6. If necessary, Steps 3 and 4 are repeated but the values of a,b,c and d may be reduced in the repeated computation of S.

7. Using the same procedure, or Step 3 through Step 6, the image of all other views are shifted so that the locations of key subject image in each view are the same.

It should be noted that if the key subject has been previously designated either at the time of picture taking or thereafter, the key subject image location (x,y) is known and can be conveyed to the computer, then Step 1 can be omitted. More importantly, after the completion of this electronic alignment process, the stored 2D images of all different views of a scene are properly aligned, in reference to the key subject. This electronic alignment process needs to be carried out only once, prior to using the 2D images to make a 3D picture for the first time. This process is not required in subsequent printing.

During exposure, after the color filters 60, projection lens 65, shutter 70 and the print material 80 are moved to proper locations, the stored 2D images are sequentially displayed on the monitor screen 52 for exposure. The exposure time can be controlled by the opening time of shutter 80 or the displaying time of 2D images on monitor screen 52. Furthermore, an aperture (which is not shown) can also be installed in association with the projection lens 65 or shutter 70 for exposure control.

A number of exposure techniques can be used in the printing method, according to the present invention: 1) color image of each view can be displayed on monitor screen 52 for exposure and proper filters 60 are used to obtain the desired color of the 3D picture; 2) the color image of each view can be separated into three color components, such as red, green, blue or RGB, or cyan, magenta, yellow or CMY. For each view, the component color images can be sequentially displayed for exposure, and proper color filters and exposure times are used to obtain the desired color of the 3D picture; 3) the color component images can also be sequentially displayed on a black-and-white monitor for exposure, and proper color filters and exposure times are used to achieve the desired color. It should be noted that video monitor 50 can also be used for viewing and, in this case, video monitor 30 can be omitted.

A chemical processor can be included in-line to process the exposed print material into photographs.

Figure 2:
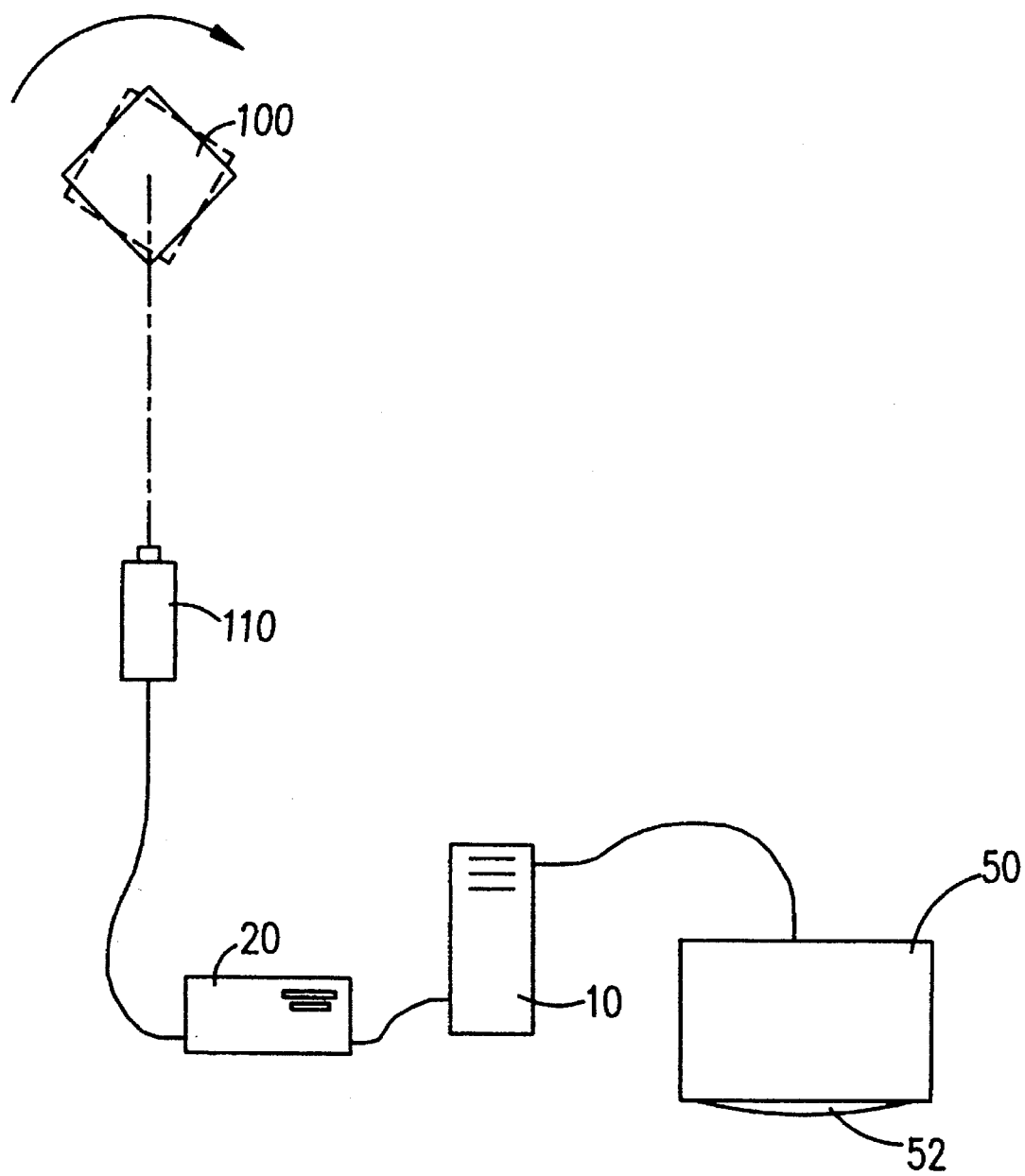
FIG. 2 illustrates a stationary electronic camera being used to acquire a series of 2D views of a scene at different viewing angles while the scene is rotating.

FIG. 2 illustrates a stationary electronic camera being used to acquire a series of 2D views of a rotating scene. As shown in FIG. 2, an electronic camera 110 is used to acquire a series of 2D views of the scene 100 at different viewing angles. The acquired images are transferred to the computer workstation 10 via input device 20 which may contain digitizing means if it is necessary to convert analog image data into digital image data.

Figure 3:
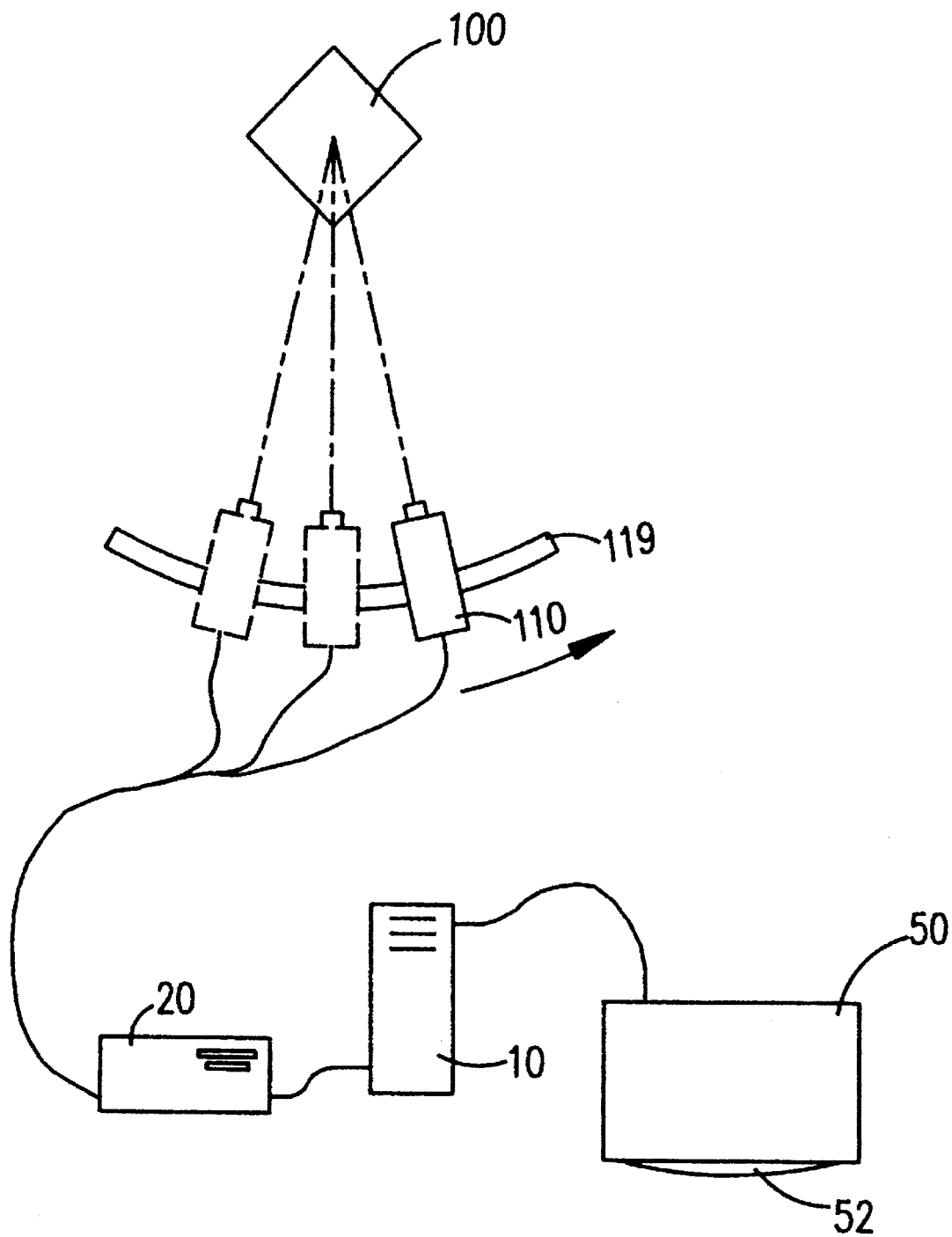
FIG. 3 illustrates an electronic camera being used to acquire a series of 2D views of a stationary scene at different viewing angles while the camera is moved to different locations in relation to the scene.

FIG. 3 illustrates an electronic camera being used to acquire a series of 2D views of stationary scene a different viewing angles. As shown in FIG. 3, an electronic camera 110 is moved along a track 119 for acquiring a series of 2D views of a stationary scene 100 at different viewing angles. The track can be curved or straight. The acquired images are transferred to the computer workstation 10 via input device 20 which may contain digitizing means if it is necessary to convert analog image data into digital image data.

Figure 4:
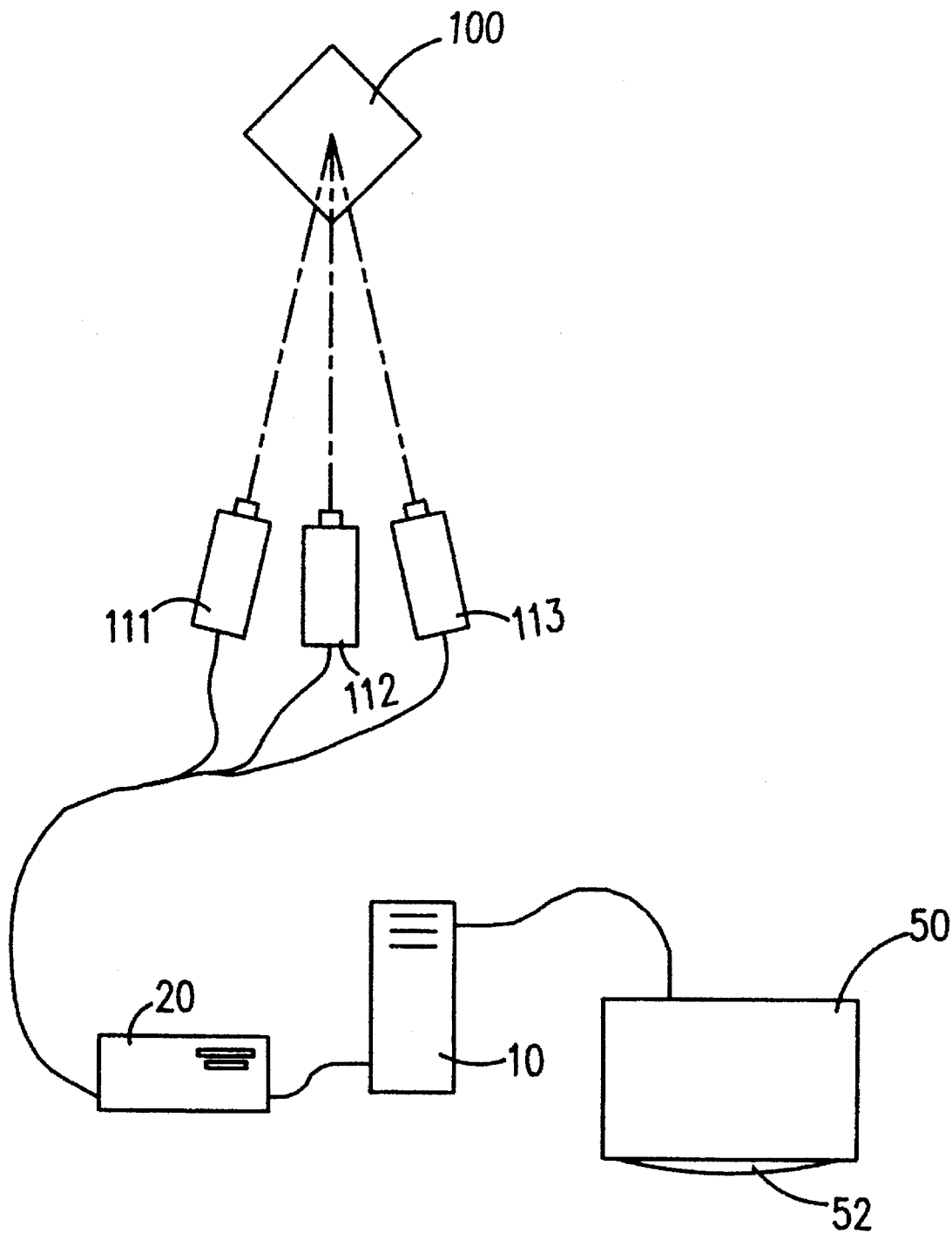
FIG. 4 illustrates a bank of electronic cameras being used to acquire a series of 2D views of a scene at different viewing angles.

FIG. 4 illustrates a bank of electronic cameras being used to acquire a series of 2D views of a scene at different viewing angles. As shown in FIG. 4, electronic cameras 111, 112 and 113 are used to acquired a series of 2D views of scene 110 at three different angles. The acquired images are transferred to the computer workstation 10 via input device 20 which may contain digitizing means if it is necessary to convert analog image data into digital image data.

Figure 5:
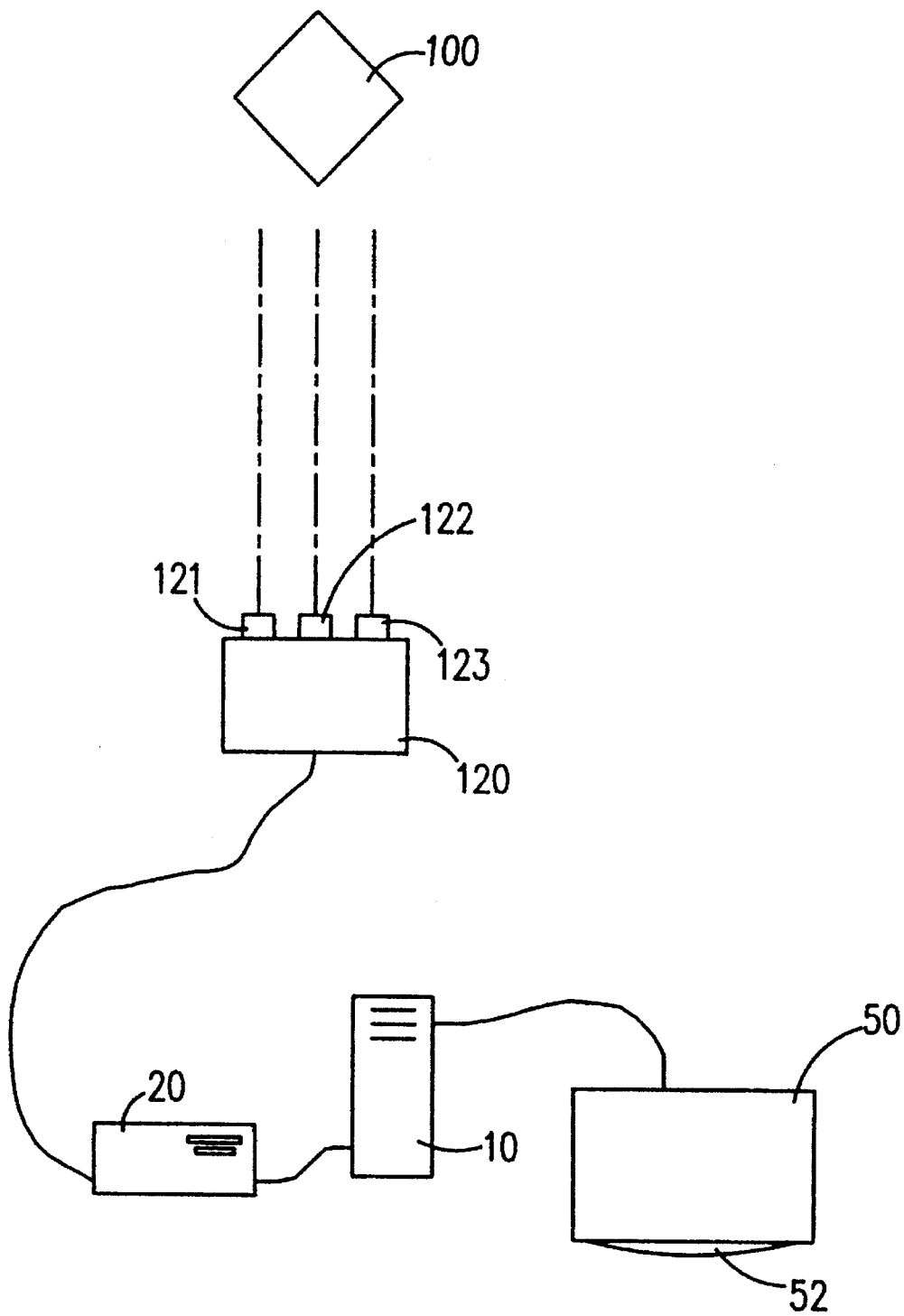
FIG. 5 illustrate a multiple-lens electronic camera being used to acquire a series of 2D views of a scene at different viewing angles.

FIG. 5 illustrate a multiple-lens electronic camera being used to acquire a series 2D views of a scene at different viewing angles. As shown in FIG. 5, an electronic camera 120 with three taking lenses 121, 122 and 123 are used to acquire a series of 2D view of scene 100 at three different viewing angles. The acquired images are transferred to the computer workstation 10 via input device 20 which may contain digitizing means if it is necessary to convert analog image data into digital image data.

Figure 6:
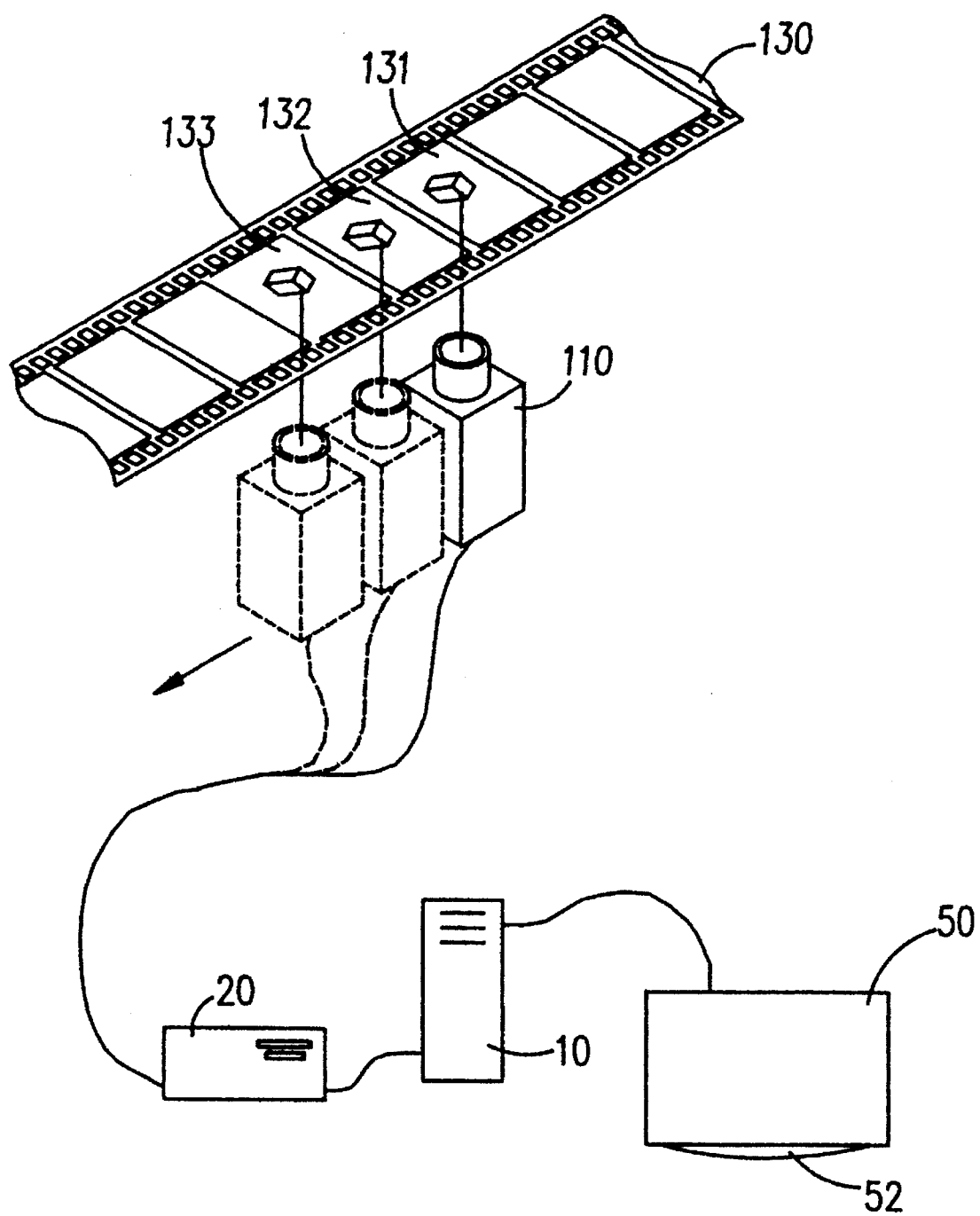
FIG. 6 illustrates an electronic camera being used to acquire a series of 2D views of a scene from a number of 2D negatives.

FIG. 6 illustrates an electronic camera being used to acquire a series of 2D views of a scene from a number of 2D negatives. As shown in FIG. 6, an electronic camera 110 is used to acquire a series of 2D views of scene. The 2D views are recorded on negatives, 131, 132 and 133 on film 130. The acquired images are transferred to the computer workstation 10 via input device 20 which may contain digitizing means if it is necessary to convert analog image data into digital image data. Similarly, the 2D views recorded on film can be acquired by a bank of electronic cameras, or by an image scanner.

Figure 7:
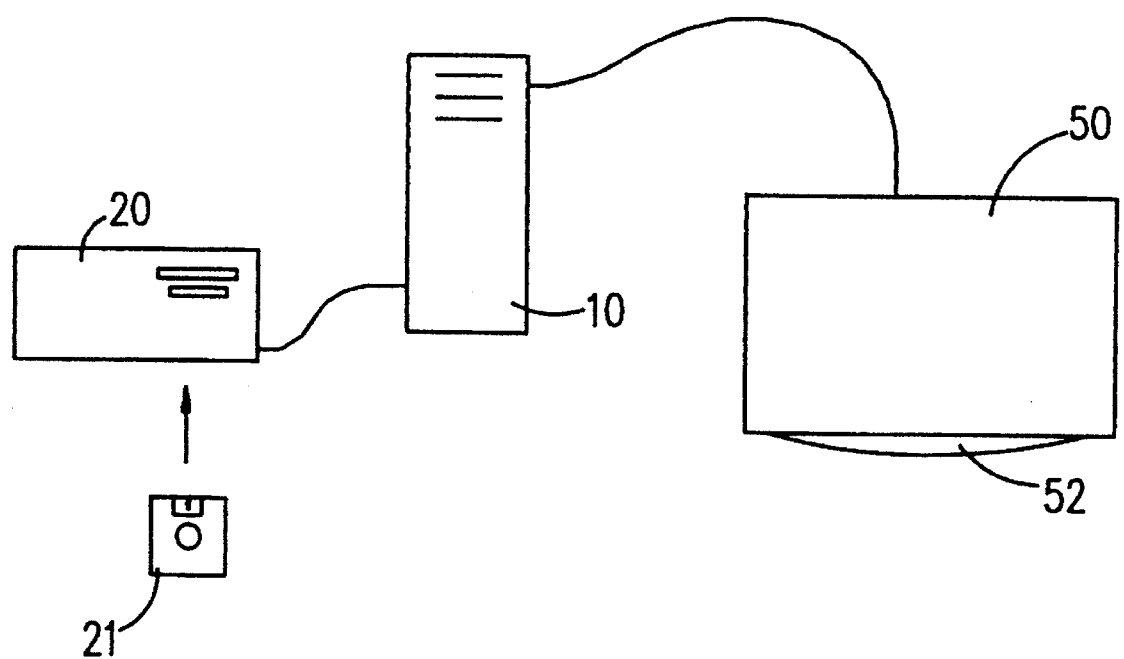
FIG. 7 illustrates 2D images recorded on a magnetic medium or an electronic medium being transferred into the computer workstation from an input device.

FIG. 7 illustrates digital 2D images being transferred into the computer workstation from an input device. As shown, 2D images can be stored in a variety of imaging storing devices such a photo-DC, a CD ROM, a magnetic tape, or a magnetic disk 21. The stored images can be read into an image input device 2D which can be a CD drive, a tape deck or a disk drive.

Figure 8:
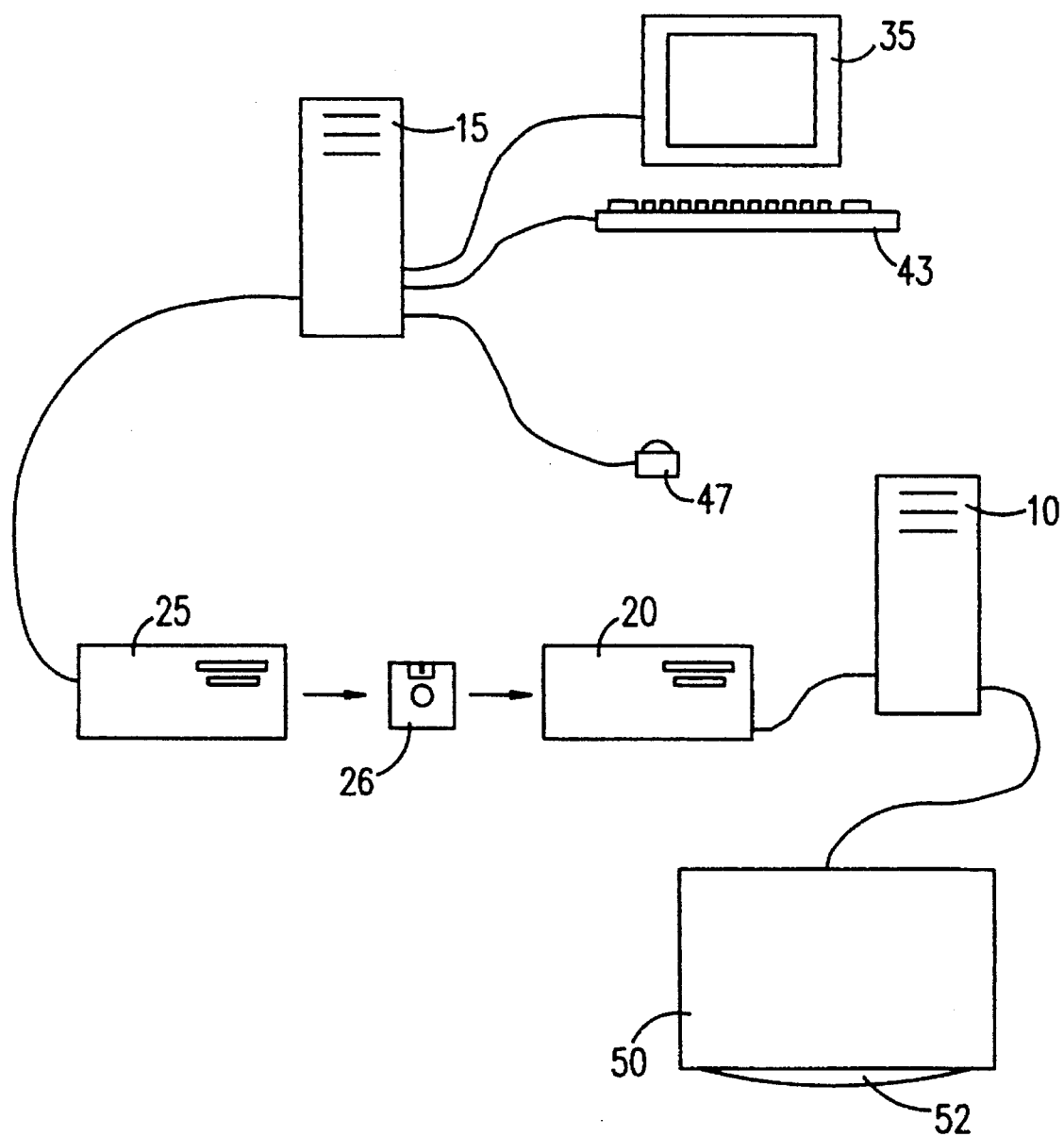
FIG. 8 illustrates another embodiment of the printing method to the present invention.

FIG. 8 illustrates another embodiment of the 3D printing method, according to the present invention. This embodiment is a variation of the preferred embodiment illustrated in FIG. 1. With this embodiment, the electronic alignment process is separated from the printing apparatus. As shown in FIG. 8, numeral 15 denotes a computer or computer workstation. Number 25 denotes a image input/output device for receiving 2D images of different views of a scene from an electronic or magnetic medium and transfers these images to the computer 15. The transferred 2D images are stored in computer 15 as digital files. Numeral 35 denotes a video monitor which is used for viewing a 2D image. Numberless 43 and 47 denote, respectively, a computer keyboard and a tracking device such as a trackball, a mouse, a light pen or a joystick. The tracking device is used for selecting the key subject on a 2D image displayed on the screen of video monitor 35. Any set of 2D images of different view of a scene stored in computer 15 can be processed so that the key subject in all different views is located at the same pixel location. The processing method is identical to the electronic alignment process described by Step 1 through Step 7 in the detailed description of FIG. 7. After a set of 2D images are processed, the key subject in all different views of a scene are aligned. These processed 2D images can be transferred into computer 10, via an electronic or magnetic storage medium 26 and image input device 20. The 2D images transferred into computer 10 are ready for exposure.

While the present invention has been described with reference to the preferred embodiment, it shall be understood by those skilled in the art that various changes may be made and equivalents may be substituted for elements thereof without departing from the spirit and scope of the invention as set forth in the appended claims.

What is claimed is:

1. A 3D printing method for producing 3D photographs from a plurality of 2D images of different views of a scene on lenticular print material, said 2D images stored in a computer as digital files, each of said views having a key subject, said method comprising the steps of:

(a) visually selecting from the screen of a video monitor the key subject image from a first of said stored 2D images;

(b) electronically obtaining the location of said selected key subject image of said first 2 image;

(c) electronically determining the key subject image location in each of the other stored 2 images;

(d) electronically shifting each of said stored 2D images so that the key subject image location of each of said stored 2D images coincides with said obtained location of said selected key subject image;

(e) sequentially displaying said shifted 2D images on the screen of a video monitor; and (f) exposing said displayed 2D images through at least one projection lens onto said lenticular print material.

2. The printing method of claim 1 further comprising the steps of;

A. first transmitting 2D images of said different views into said computer; and

B. next storing said received 2D images as digital files in said computer; and

C. next completing the steps set forth in claim 1.

3. A filmless printing method for printing 3D photographs from a plurality of 2D images of different views of a scene on lenticular print material, said 2D images being stored in a computer as digital files, each of said views having a key subject, said method comprising the steps of:

(a) displaying said first stored 2D image on the screen of a viewing video monitor and visually selecting the key subject image from a first of said stored 2D images;

(b) electronically obtaining the location of said selected key subject image of said first 2D image;

(c) electronically determining the key subject image location in each of the other stored 2D images;

(d) electronically shifting each of said stored 2D images so that the key subject image location of each of said stored 2D images coincides with said obtained location of said selected key subject image;

(e) sequentially displaying said shifted 2D images on the screen of a video monitor; and (f) exposing said displayed 2D images on an exposing video monitor through at least one projection lens onto said lenticular print material.

4. The printing method of claim 1 wherein the location of key subject image obtained in Step (b) is expressed in terms of pixels (x,y); said printing method further comprising the steps of;

(A) electronically selecting a portion of said first 2D image bounded by pixels (x+a,y+b), (x-31 a,y+b), (x+a,y-b) and (x-a,y-b) as a template, wherein a and b each represents a number of pixels ranging from 5 to at least 100;

(B) electronically selecting a portion of a second stored 2D image bounded by pixels (x+c,y+d), (x-c,y+d), (x+c,y-d) and (x-c,y-d) as a search area wherein c and d each represents a number of pixels with (c-a) and (d-b) each ranging from 5 to at least 100;

(C) electronically moving said template within said search area in order to find a match in image based upon the computer calculating a series of correlation coefficients $S(m,n)$ using the following formula:

$$S(m,n) = \sum_i \sum_j \{B1(i,j) - B2(i+m, j+n)\}^2$$

where $(x-a) \leq i \leq (x+a)$, $(y-b) \leq j \leq (y+b)$;

$(a-c) \leq m \leq (c-a)$, and $(b-d) \leq n \leq (d-b)$.

wherein $B1(p,q)$ is the pixel intensity of pixel $(p,q)$ in said template, $B2(r,s)$ is the pixel intensity of pixel $(r,s)$ in said search area;

(D) electronically sorting out $S(u,v)$ which is the minimum value of $S(m,n)$;

(E) electronically shifting said second 2D image by a distance $(u,v)$;

(F) repeating step (B) through Step (e) for each of the other 2D images.

5. The 3D printing method of claim 1 in which the 2D images of different views of a scene are generated in a computer prior to such 2D images being stored in a computer as digital files.

6. The 3D printing method of claim 1 wherein said displayed 2D images comprise color images.

7. The 3D printing method of claim 1 wherein said displayed 2D images comprise black and white images.

8. The 3D printing method of claim 1 wherein said displayed 2D images comprise color component images.

9. The printing method of claim 1 wherein Step further comprises that the projection lens is focused on said video monitor and said print material.

10. The printing method of claim 9 further comprising the step of moving (i) said at least one projection lens and (ii) said lenticular print material in the same direction to different positions in relation to said monitor screen for exposing said displayed 2D images onto said lenticular print material at different projection angles.

11. The printing method of claim 2 wherein the 2D images to be transmitted in step A are acquired by at least one electronic camera.

12. The printing method of claim 2 where in the 2D images to be transmitted in Step A are recorded on an element selected from the group consisting of a magnetic medium, an electronic medium, a photo-CD and a photographic film.

13. A filmless printer for producing 2D photographs from a plurality of 2D images of different views of a scene on lenticular print material, said 2D images stored in computer as digital files, each of said stored 2D images having a key subject, said 3D printer comprising:

(a) means in said computer for storing said 2D images;

(b) means in said computer for electronically determining the location of the key subject image in said stored 2D images;

(c) means in said computer for electronically shifting said stored 2D images;

(d) a video monitor;

(e) at least one projection lens for exposing images displayed on said video monitor onto said lenticular print material.

14. The filmless single stage printer of claim 13 further comprising:

A. A viewing video monitor for determining the location of the key subject image in said stored 2D images in Step (b) of claim 13; and B. A tracking device for selecting a position on an image displayed on said viewing monitor.

15. The filmless single-stage printer of claim 13 further comprising:

(a) an image input device for receiving 2D images into said computer, said image input device comprises an element selected from the group consisting of a tape deck, a photo-CD drive, a CD-ROM reader, an image scanner and a disk drive.

16. The filmless single stage printer of claim 13 further comprising:
   (a) the plurality of optical filters for filtering the colors of images displayed on said video monitor; and
   (b) at least one shutter for controlling the exposure time.

17. The filmless single-stage printer of claim 13 wherein said video monitor comprises a color monitor.

18. The filmless single-stage printer of claim 13 wherein said video monitor comprises a black and white monitor.

* * * * *

UNITED STATES PATENT AND TRADEMARK OFFICE
CERTIFICATE OF CORRECTION

PATENT NO. : 5,572,633
DATED : November 5, 1996
INVENTOR(S) : LO, Allen K.W. and Kenneth Q. Lao It is certified that error appears in the above—identified patent and that said Letters Patent is hereby corrected as shown below:

```
Col. 6, line 37 change "Numberless" to -- Numerals --.
Col. 7, line 14 replace ";" with -- : --;
        line 16 delete "and";
        line 46 replace ";" with -- : --.
Col. 8, line 9 after ";" insert -- and --;
        line 10 change "Step" to -- step --;
        line 22 change "Step" to -- step (f) --;
        line 51 after ";" insert -- and --;
        line 57 change "A viewing" to -- a viewing --;
        line 59 change "Step" to -- step --;
        line 61 change "A tracking" to -- a tracking --.
Col. 9, line 5 change "the plurality" to -- a plurality --.
```

Signed and Sealed this

Eighth Day of July, 1997

Attest:

BRUCE LEHMAN

*Attesting Officer*  *Commissioner of Patents and Trademarks*